(12) United States Patent
Michiwaki et al.

(10) Patent No.: US 6,308,108 B1
(45) Date of Patent: Oct. 23, 2001

(54) SYSTEM FOR CALCULATING AN OPERATING TIME OF A MEASURING MACHINE

(75) Inventors: Hirokazu Michiwaki; Katsumi Sato, both of Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/255,735

(22) Filed: Feb. 23, 1999

(30) Foreign Application Priority Data

Feb. 27, 1998 (JP) .................................................. 10-047891

(51) Int. Cl.⁷ ...................................................... G06F 19/00
(52) U.S. Cl. ........................................... 700/195; 702/176
(58) Field of Search ..................................... 700/181, 182, 700/184, 193, 188, 195, 86, 87; 702/176–178, 33, 36, 94, 95, 150–153, 167, 168

(56) References Cited

U.S. PATENT DOCUMENTS

| 4,819,195 | 4/1989 | Bell et al. | 702/95 |
| 5,198,990 | * 3/1993 | Farzan et al. | 702/168 |
| 5,257,204 | * 10/1993 | Sawada et al. | 700/182 |
| 5,862,604 | * 1/1999 | Fuchs et al. | 33/503 |
| 5,895,444 | * 4/1999 | Ruck et al. | 702/168 |
| 5,966,681 | * 10/1999 | Bernhardt et al. | 702/152 |

* cited by examiner

*Primary Examiner*—William Grant
*Assistant Examiner*—Zoila Cabrera
(74) *Attorney, Agent, or Firm*—Morgan, Lewis & Bockius LLP

(57) ABSTRACT

An apparatus for calculating an operating time of a measuring machine, includes: a part program storing unit storing a part program; a command analyzing unit extracting commands relating to movement of a measurement probe from the part program stored in the part program storing unit, calculating operating times required for the measuring machine to implement the respective extracted commands, on the basis of movement parameters for the movement of said measurement probe, and summing up the calculated operating times to calculate a total operating time from a start of measurement to an end of measurement; and a displaying unit displaying the total operating time thus calculated by the command analyzing unit.

17 Claims, 10 Drawing Sheets

GOTO/X1, Y1, Z1

FIG. 8

```
DMISMN/'S504mes0'
SS Probe file", Stylus'1', CS name"
D (mcs) = DATSET/MCS
TIME/START
GOTO/-0.0900, 400.0900, 400.0900
MEAS/SPHERE, F (BUF_1), 4
PTMEAS/CART, 77.7405, 336.7020, 116.6950, -0.0000, 1.0000, -0.0000
GOTO/92.8170, 338.2020, 116.6950
GOTO/92.8155, 325.9095, 116.6950
PTIMEAS/CART, 89.2575, 325.8995, 116.6950, 1.0000, 0.0041, -0.0000
GOTO/90.7575, 324.9805, 132.2260
GOTO/78.1175, 324.5735, 132.2260
PTMEAS/CART, 78.1175, 324.5735, 126.6965, 0.0041, -0.0000, 1.0000
GOTO/78.1235, 312.6145, 128.1965
PTMEAS/CART, 78.1235, 314.7160, 116.0820, -0.0000, -1.0000, -0.0000
ENDMES
GOTO/262.6285, 241.1625, 116.0820
MEAS/SPHERE, F (BUF_2) ,10
PTMEAS/CART, 262.5285, 241.6665, 93.8580, 0.0080, -0.0080, 0.9999
PTMEAS/CART, 264.3775, 241.6545, 93.7395, -0.0000, -0.0033, 1.0000
PTMEAS/CART, 265.9920, 241.6495, 93.3840, 0.0038, -0.0000, 1.0000
PTMEAS/CART, 265.2855, 243.2935, 93.5815, -0.0000, -0.0037, 1.0000
PTMEAS/CART, 265.2890, 245.1310, 93.3040, 0.0040, -0.0000, 1.0000
PTMEAS/CART, 262.6555, 245.1325, 93.6005, -0.0036, -0.0000, 1.0000
PTMEAS/CART, 260.9725, 245.0515, 93.4805, -0.0042, -0.0000, 1.0000
PTMEAS/CART, 259.6200, 243.1775, 93.4480, -0.0038, -0.0000, 1.0000
PTMEAS/CART, 258.6250, 241.9630, 93.1205, -0.1431, -0.0000, 0.9897
PTMEAS/CART, 259.1570, 239.2540, 92.8180, -0.0041, -0.0000, 1.0000
ENDMES
MEAS/CIRCLE, F (BUF_3), 3
PTMEAS/CART, 279.6600, 216.1975, 94.3180, -0.9874, 0.1582, -0.0000
GOTO/273.9925, 210.9295, 94.3180
PTMEAS/CART, 278.3660, 212.1490, 94.3180, -1.0000, -0.0084, -0.0000
GOTO/276.8660, 204.2635, 94.3180
PTMEAS/CART, 284.3100, 205.7960, 94.3180, -0.0000, -1.0000, -0.0000
ENDMES
GOTO/318.4000, 204.3320, 94.3180
MEAS/CIRCLE, F (BUF_4), 20
PTMEAS/CART, 318.1485, 200.6315, 76.5375, 0.1533, 0.9882, -0.0000
PTMEAS/CART, 320.3480, 200.1285, 76.5375, -0.3523, 0.9359, -0.0000
PTMEAS/CART, 321.2125, 200.0095, 76.5375, -0.0000, 1.0000, -0.0000
PTMEAS/CART, 324.7855, 199.9785, 76.5375, -0.7139, 0.7003, -0.0000
PTMEAS/CART, 326.4680, 200.2185, 76.5375, -0.6951, 0.7189, -0.0000
PTMEAS/CART, 326.5070, 200.2255, 76.5375, -0.0000, 1.0000, -0.0000
PTMEAS/CART, 328.5800, 200.7655, 76.5375, -0.5737, 0.8191, -0.0000
PTMEAS/CART, 330.2290, 201.3970, 76.5375, -0.6866, 0.7270, -0.0000
PTMEAS/CART, 331.6965, 202.1285, 76.5375, -0.7011, 0.7131, -0.0000
PTMEAS/CART, 333.0210, 202.9470, 76.5375, -0.7071, 0.7071, -0.0000
PTMEAS/CART, 334.4965, 204.0735, 76.5375, -0.7043, 0.7099, -0.0000
PTMEAS/CART, 335.6305, 205.1275, 76.5375, -0.7206, 0.6933, -0.0000
PTMEAS/CART, 336.5005, 206.0785, 76.5375, -0.7096, 0.7046, -0.0000
PTMEAS/CART, 337.1950, 206.9495, 76.5375, -0.7340, 0.6792, -0.0000
PTMEAS/CART, 337.8250, 207.8530, 76.5375, -0.7244, 0.6894, -0.0000
PTMEAS/CART, 338.6125, 209.1845, 76.5375, -0.7010, 0.7132, -0.0000
PTMEAS/CART, 339.3375, 210.7185, 76.5375, -0.8885, 0.4588, -0.0000
PTMEAS/CART, 339.8955, 212.2680, 76.5375, -0.9556, 0.2948, -0.0000
```

FIG. 9
```
DMISMN/'S504mes0'
PRINTER/OFF
SS Probe file", Stylus'1', CS name"
D (MCS) = DATSET/MCS
SSTIME/START
GOTO/ABS, CART, -0.0900, 400.0900, 400.0900
MEAS/SPHERE, FA (BUF_1), 4
PTMEAS/CART, 77.7405, 336.7020, 116.6950, I-J-K, -0.0000, 1.0000, -0.0000
GOTO/ABS, 92.8170, 338.2020, 116.6950
GOTO/ABS, CART, 92.8155, 325.9095, 116.6950
PTMEAS/CART, 89.2575, 325.8995, 116.6950, I-J-K, 1.0000, 0.0041, -0.0000
GOTO/ABS, CART, 90.7575, 324.9805, 132.2260
GOTO/ABS, CART, 78.1175, 324.5735, 132.2260
PTMEAS/CART, 78.1175, 324.5735, 126.6965, I-J-K, 0.0041, -0.0000, 1.0000
GOTO/ABS, CART, 78.1235, 312.6145, 128.1965
PTMEAS/CART, 78.1235, 314.7160, 116.0820, I-J-K, -0.0000, -1.0000, -0.0000
ENDMES
GOTO/ABS, CART, 262.6285, 241.1625, 116.0820
MEAS/SPHERE, FA (BUF_2), 10
PTMEAS/CART, 262.5285, 241.6665, 93.8580, I-J-K, 0.0080, -0.0080, 0.9999
PTMEAS/CART, 264.3775, 241.6545, 93.7395, I-J-K, -0.0000, -0.0033, 1.0000
PTMEAS/CART, 265.9920, 241.6495, 93.3840, I-J-K, 0.0038, -0.0000, 1.0000
PTMEAS/CART, 265.2855, 243.2935, 93.5815, I-J-K, -0.0000, -0.0037, 1.0000
PTMEAS/CART, 265.2890, 245.1310, 93.3040, I-J-K, 0.0040, -0.0000, 1.0000
PTMEAS/CART, 262.6555, 245.1325, 93.6005, I-J-K, -0.0036, -0.0000, 1.0000
PTMEAS/CART, 260.9725, 245.0515, 93.4805, I-J-K, -0.0042, -0.0000, 1.0000
PTMEAS/CART, 259.6200, 243.1775, 93.4480, I-J-K, -0.0038, -0.0000, 1.0000
PTMEAS/CART, 258.6250, 241.9630, 93.1205, I-J-K, -0.1431, -0.0000, 0.9897
PTMEAS/CART, 259.1570, 239.2540, 92.8180, I-J-K, -0.0041, -0.0000, 1.0000
ENDMES
MEAS/CIRCLE, FA (BUF_3), 3, F (BUF_3)
PTMEAS/CART, 279.6600, 216.1975, 94.3180, I-J-K, -0.9874, 0.1582, -0.0000
GOTO/ABS, CART, 273.9925, 210.9295, 94.3180
PTMEAS/CART, 278.3660, 212.1490, 94.3180, I-J-K, -1.0000, -0.0084, -0.0000
GOTO/ABS, CART, 276.8660, 204.2635, 94.3180
PTMEAS/CART, 284.3100, 205.7960, 94.3180, I-J-K, -0.0000, -1.0000, -0.0000
ENDMES
GOTO/ABS, CART, 318.4000, 204.3320, 94.3180
MEAS/CIRCLE, FA (BUF_4), 20, F (BUF_4)
PTMEAS/CART, 318.1485, 200.6315, 76.5375, I-J-K, 0.1533, 0.9882, -0.0000
PTMEAS/CART, 320.3480, 200.1285, 76.5375, I-J-K, -0.3523, 0.9359, -0.0000
PTMEAS/CART, 321.2125, 200.0095, 76.5375, I-J-K, -0.0000, 1.0000, -0.0000
PTMEAS/CART, 324.7855, 199.9785, 76.5375, I-J-K, -0.7139, 0.7003, -0.0000
PTMEAS/CART, 326.4680, 200.2185, 76.5375, I-J-K, -0.6951, 0.7189, -0.0000
PTMEAS/CART, 326.5070, 200.2255, 76.5375, I-J-K, -0.0000, 1.0000, -0.0000
PTMEAS/CART, 328.5800, 200.7655, 76.5375, I-J-K, -0.5737, 0.8191, -0.0000
PTMEAS/CART, 330.2290, 201.3970, 76.5375, I-J-K, -0.6866, 0.7270, -0.0000
PTMEAS/CART, 331.6965, 202.1285, 76.5375, I-J-K, -0.7011, 0.7131, -0.0000
PTMEAS/CART, 333.0210, 202.9470, 76.5375, I-J-K, -0.7071, 0.7071, -0.0000
PTMEAS/CART, 334.4965, 204.0735, 76.5375, I-J-K, -0.7043, 0.7099, -0.0000
PTMEAS/CART, 335.6305, 205.1275, 76.5375, I-J-K, -0.7206, 0.6933, -0.0000
PTMEAS/CART, 336.5005, 206.0785, 76.5375, I-J-K, -0.7096, 0.7046, -0.0000
PTMEAS/CART, 337.1950, 206.9495, 76.5375, I-J-K, -0.7340, 0.6792, -0.0000
PTMEAS/CART, 337.8250, 207.8530, 76.5375, I-J-K, -0.7244, 0.6894, -0.0000
PTMEAS/CART, 338.6125, 209.1845, 76.5375, I-J-K, -0.7010, 0.7132, -0.0000
PTMEAS/CART, 339.3375, 210.7185, 76.5375, I-J-K, -0.8885, 0.4588, -0.0000
```

| | MOVEMENT VELOCITY Vmv (mm/sec) | | | | |
|---|---|---|---|---|---|
| | 10 | 50 | 100 | ............ | 500 |
| MOVEMENT ACCELERATION TIME Tmv (sec) | 0.4 | 0.24 | 0.0875 | -0.034 | ............ | -0.160 |
| | 0.48 | 0.30 | 0.080 | -0.052 | ............ | -0.189 |
| | 0.6 | 0.410 | 0.160 | -0.050 | ............ | -0.209 |
| | 0.8 | 0.490 | 0.078 | -0.107 | ............ | -0.284 |
| | 1.2 | 0.720 | 0.051 | -0.180 | ............ | -0.404 |

SYSTEM FOR CALCULATING AN OPERATING TIME OF A MEASURING MACHINE

BACKGROUND OF THE INVENTION

1. Field of the Invention

The present invention relates to a system for calculating an operating time of a measuring machine, and more particularly to a system which calculates an expected operating time that is to be consumed in a movement operation and a measurement operation of a measurement probe in a CNC three-dimensional measuring machine or the like.

2. Description of the Related Art

A CNC (Computer Numerical Control) three-dimensional measuring machine uses a part program as a program for controlling measurement. Such a part program is produced by a CAD system or an editor program, and described by, for example, DMIS (Dimensional Measuring Interface Standard) language specification. In the planning of a production process, it is important to know a measurement operating time based on the program.

In order to obtain the time required for a measurement operation which is controlled by a part program, conventionally, it is required to perform a process in which, after the part program is produced, a three-dimensional measuring machine is actually operated by using the part program, and the total operating time required for measurement is then measured. This produces a problem in that, in the design stage of a part program, the part program cannot be corrected so as to match an appropriate operating time.

SUMMARY OF THE INVENTION

The invention has been conducted in view of the problem. It is an object of the invention to provide a system for calculating an operating time of a measuring machine which, even in the design stage of a part program, can predict the time required for a measurement operation and which is very useful in evaluation of the part program, preparation of production process, and the like.

The apparatus for calculating an operating time of a measuring machine according to the invention, includes: a part program storing unit storing a part program; a command analyzing unit extracting commands relating to movement of a measurement probe from the part program stored in the part program storing unit, calculating operating times required for the measuring machine to implement the respective extracted commands, on the basis of movement parameters for the movement of said measurement probe, and summing up the calculated operating times to calculate a total operating time from a start of measurement to an end of measurement; and a displaying unit displaying the total operating time thus calculated by the command analyzing unit.

The program recorded on a medium according to the invention and for calculating an operating time of a measuring machine includes the steps that; a part program stored in a storing unit is read out, commands relating to movement of a measurement probe are extracted from the part program, operating times required for the measuring machine to implement the respective extracted commands are calculated on the basis of movement parameters which are previously set or described in the part program, the calculated operating times are summed up to calculate a total operating time from a start of measurement to an end of measurement, and the calculated total operating time is displayed on a displaying unit.

According to the invention, only commands required for estimation of an operating time and relating to movement of a measurement probe are extracted from the part program stored in the storing unit, and the extracted commands are analyzed, thereby calculating operating times due to the respective commands. The calculated operating times are summed up so as to calculate a total operating time of the measuring machine from a start of measurement to an end of measurement. Therefore, it is not required to actually operate the measuring machine in order to check the measurement time. Consequently, the time required for checking can be shortened. In the design stage of the part program, moreover, movement velocity information, movement path information, and the like can be suitably changed, so that the part program matches an adequate total operating time. According to this configuration, reduction of the manhours for measurement, setting of the production cost, and the like can be easily performed.

The commands relating to movement of the measurement probe include a movement command having movement target position information, and a measurement command having measurement position information and measurement direction information. With respect to these commands relating to movement, the movement time can be obtained by designating the velocity and the acceleration time. As movement parameters for calculating an operating time, the movement velocity, the movement acceleration time, the measurement velocity, and the measurement acceleration time are previously given from the external by a movement parameter setting unit, or described in the part program.

In the case of a movement command, for example, a velocity curve can be obtained from the movement acceleration time and the movement velocity. Therefore, the time when movement is performed along a measurement curve by a movement distance which is specified by the target position information can be calculated as the movement time.

In the case of a measurement command, for example, operations are performed in the following manner. Measurement position information and measurement direction information are given. The measurement probe is temporarily stopped or decelerated at a position before the measurement position, and then moved from the position in the measurement direction. After the measurement probe makes contact with a workpiece, the probe is moved back. Therefore, the movement time in each of the steps can be calculated on the basis of movement parameters such as the movement velocity, the movement acceleration time, the measurement velocity, and the measurement acceleration time.

When the calculated operating time is different from the operating time in the case where the measuring machine is actually operated, a correction process may be performed in the command analyzation, by using a correction coefficient based on the movement velocity.

BRIEF DESCRIPTION OF THE DRAWINGS

FIG. 8 is a view showing an example of a DMIS part program which is to be produced in the system;

FIG. 9 is a view showing an example of a part program which is converted from the program of FIG. 8 in the system;

DETAILED DESCRIPTION OF THE PREFERRED EMBODIMENTS

Hereinafter, preferred embodiments of the invention will be described with reference to the accompanying drawings.

Figure 1:
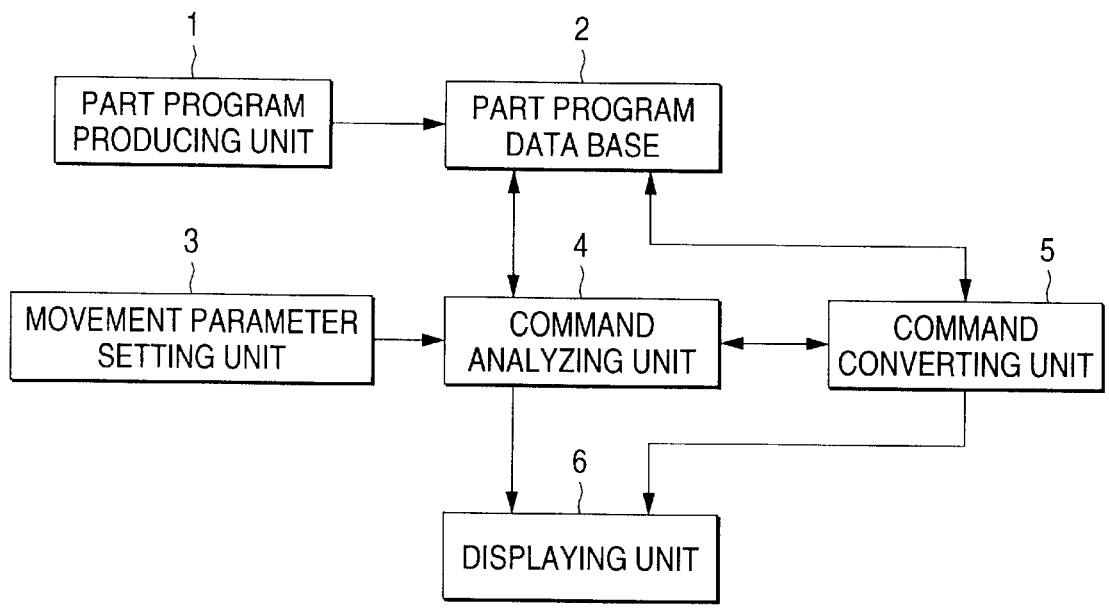
FIG. 1 is a functional block diagram of a system for producing, editing, and evaluating a part program according to an embodiment of the invention.

FIG. 1 is a functional block diagram of a system for producing, editing, and evaluating a part program and including a system for calculating an operating time of a CNC three-dimensional measuring machine which is an embodiment of the invention.

Referring to FIG. 1, a part program producing unit 1 automatically or manually produces a part program defining a procedure of a measurement operation of the CNC three-dimensional measuring machine. The producing unit 1 is configured by a CAD/CAT (Computer Aided Design/Computer Aided Testing) system, an editor for inputting a part program in ASCII code, and the like. For example, a part program which is to be produced by the unit 1 is a program based on the DMIS language. The part program produced by the part program producing unit 1 is stored into a part program data base 2 as a program file.

A movement parameter setting unit 3 sets movement parameters such as a velocity and an acceleration time which will be described later. A command analyzing unit 4 analyzes one by one the commands of the part program stored in the data base 2, to calculate an operating time of measurement. As required, a command converting unit 5 converts the DMIS part program stored in the data base 2 into a part program of a language which is suitable to the three-dimensional measuring machine. A displaying unit 6 displays the operating time which is calculated by the command analyzing unit 4, and the command which is converted by the command converting unit 5.

Next, the operation of the system will be described.

Figure 2:
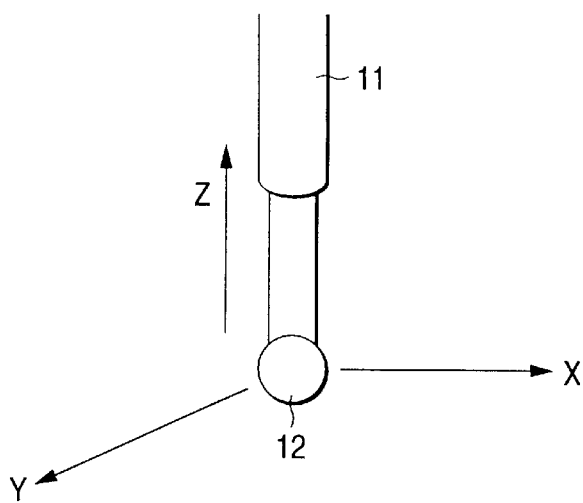
FIG. 2 is a perspective view showing a measurement probe, the movement time of which is to be calculated by the system.

In the CNC three-dimensional measuring machine, the position coordinate (X, Y, Z) of an end ball 12 of a measurement probe 11 is designated as shown in FIG. 2, so that the measurement probe 11 is moved to a target position. In the case of a DMIS program, typical commands relating to movement of the measurement probe 11 are a movement command (GOTO command) and a measurement command (PTMEAS command). Hereinafter, the contents of the commands and the method of calculating the operating time will be described.

(1) GOTO/X1, Y1, Z1

Figure 3:
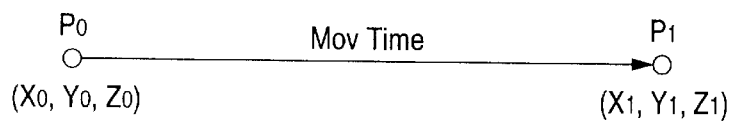
FIG. 3 is a view illustrating an example of a movement command.
Figure 4A:
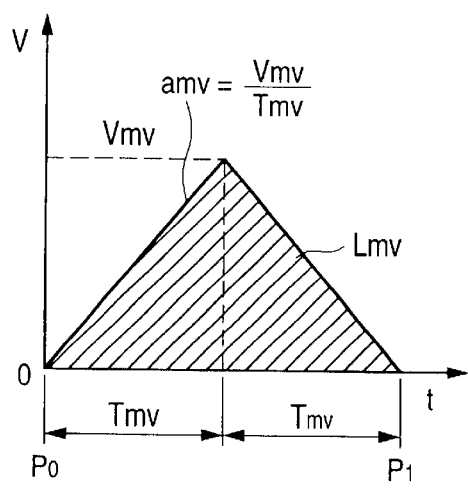
FIGS. 4A to 4C are views showing a velocity curve due to the movement command.

This is a command for, as shown in FIG. 3, moving the measurement probe 11 from the current position P0 ($X_0$, $Y_0$, $Z_0$) to the target position P1 ($X_1$, $Y_1$, $Z_1$). The movement of the measurement probe 11 due to the command is performed in accordance with the velocity curve shown in FIGS. 4A to 4C. Specifically, a movement velocity Vmv and a movement acceleration time Tmv are first given as movement parameters. The measurement probe 11 is accelerated so as to reach from a still state to a velocity Vmv during the time Tmv, and is started to decelerate at an instance preceding the stop thereof by the time Tmv. When, as shown in FIG. 4A, the driving of the probe 11 is controlled so that the prove 11 is accelerated so as to reach from a still state to the velocity Vmv during the time Tmv and deceleration is started at the instance of the reaching of the velocity Vmv so that the velocity becomes zero after elapse of the time Tmv, the movement distance Lmv and the movement time Mov Time in this case are as follows:

[Ex. 1]

Lmv=Tmv*Vmv

Mov Time=2*Tmv

Figure 4B:
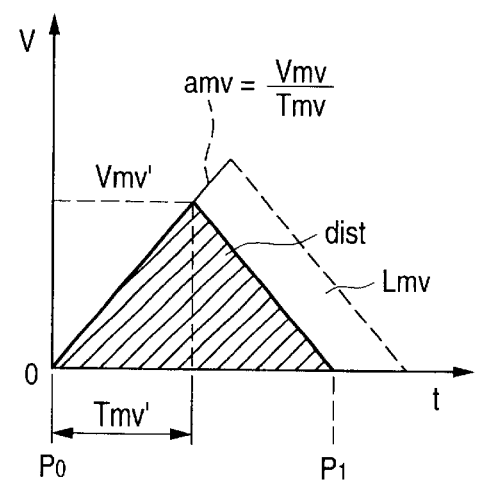

In the case where the movement distance dist of the probe 11 is shorter than Lmv as shown in FIG. 4B, the maximum velocity is Vmv' (<Vmv) and the acceleration time is Tmv' (<Tmv). Since the acceleration amv is obtained by amv=Vmv/Tmv=Vmv'/Tmv', the acceleration time Tmv' and the movement time Mov Time are as follows:

[Ex. 2]

Tmv'=$\sqrt{(dist/amv)}$

Mov Time=2*Tmv'

Figure 4C:
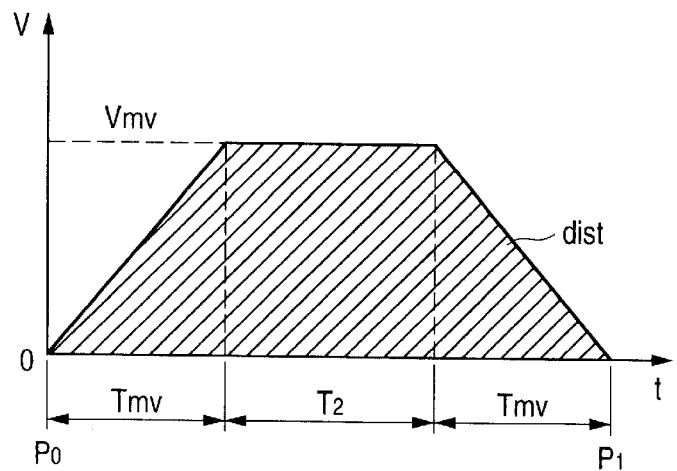

In the case where the movement distance dist of the probe 11 is longer than Lmv as shown in FIG. 4C, the movement time Mov Time is obtained in the following manner with indicating a constant-velocity time as T2:

[Ex. 3]

T2=(dist−Lmv)/Vmv

Mov Time=2*Tmv+T2

(2) PTMEAS/CART, X1, Y1, Z1, I, J, K

Figure 5:
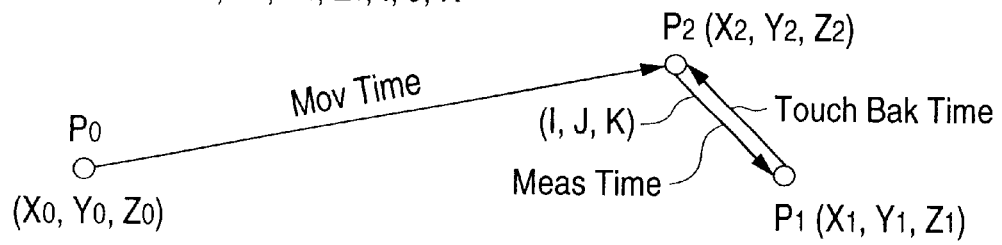
FIG. 5 is a view illustrating an example of a measurement command.

This is a command for, as shown in FIG. 5, moving the measurement probe 11 from the current position P0 ($X_0$, $Y_0$, $Z_0$) to the measurement position P1 ($X_1$, $Y_1$, $Z_1$) and then performing the measurement operation. In the command, the coordinates ($X_1$, $Y_1$, $Z_1$) of the measurement position P1 and the vector (I, J, K) of the movement direction are given. The measurement probe 11 is first moved by a controller of the three-dimensional measuring machine to a measurement proximate position P2 ($X_2$, $Y_2$, $Z_2$) which is separated by a predetermined distance (for example, 2 mm) from the measurement position P1 in the direction opposite to the measurement direction (I, J, K). Next, the probe is slowly moved from P2 to P1. When the measurement probe 11 makes contact with a workpiece at P1, the probe 11 is then moved in the direction opposite to the measurement direction.

Figure 6:
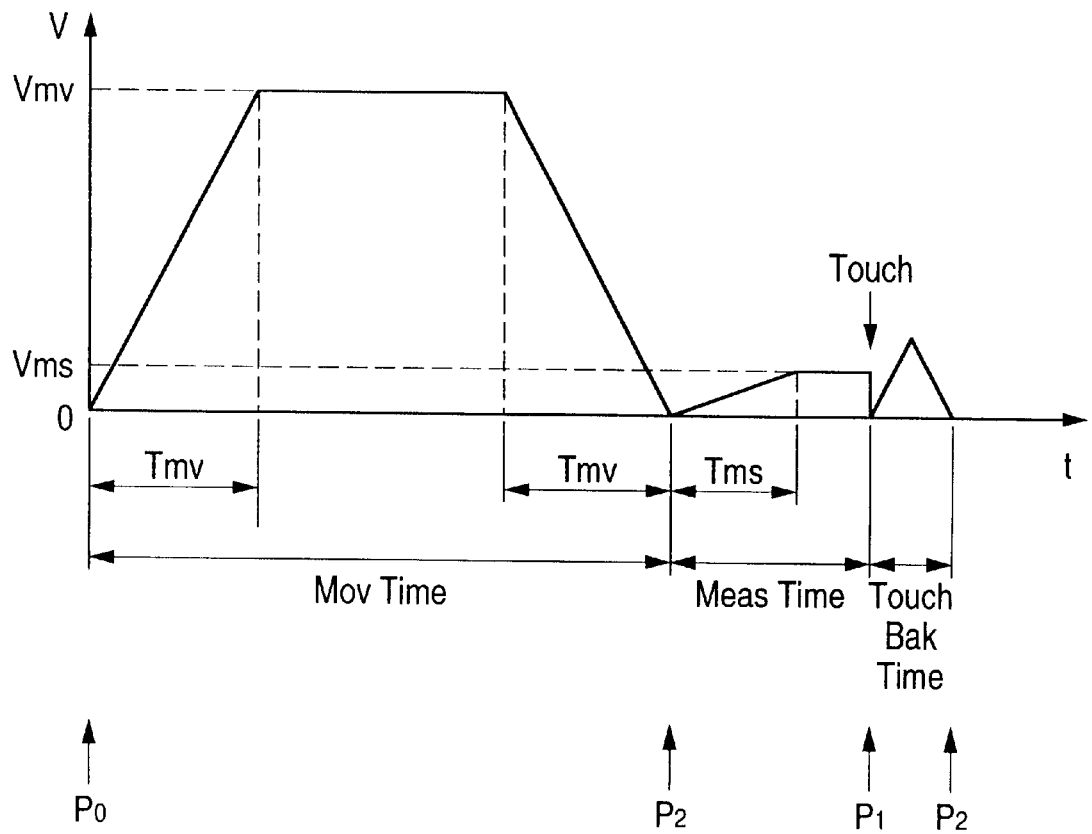
FIG. 6 is a view showing a velocity curve due to the measurement command.

FIG. 6 is a view showing the velocity curve of the PTMEAS command.

With respect to the movement from the current position P0 to the measurement proximate position P2, the movement time Mov Time is calculated in the strictly same manner as described above on the basis of the movement velocity Vmv and the movement acceleration time Tmv. In the movement from the measurement proximate position P2 to the measurement position P1, a measurement time Meas Time is calculated on the basis of a measurement acceleration time Tms and a measurement velocity Vms, and, in the movement from the measurement position P1 to the measurement proximate position P2, a touch back time Touch Bak Time is calculated based on, for example, the movement velocity curve. When the distance between P1 and P2 is previously set to a fixed value, Meas Time and Touch Bak Time have a constant value in accordance with the velocity information and the acceleration time information.

Figure 7:
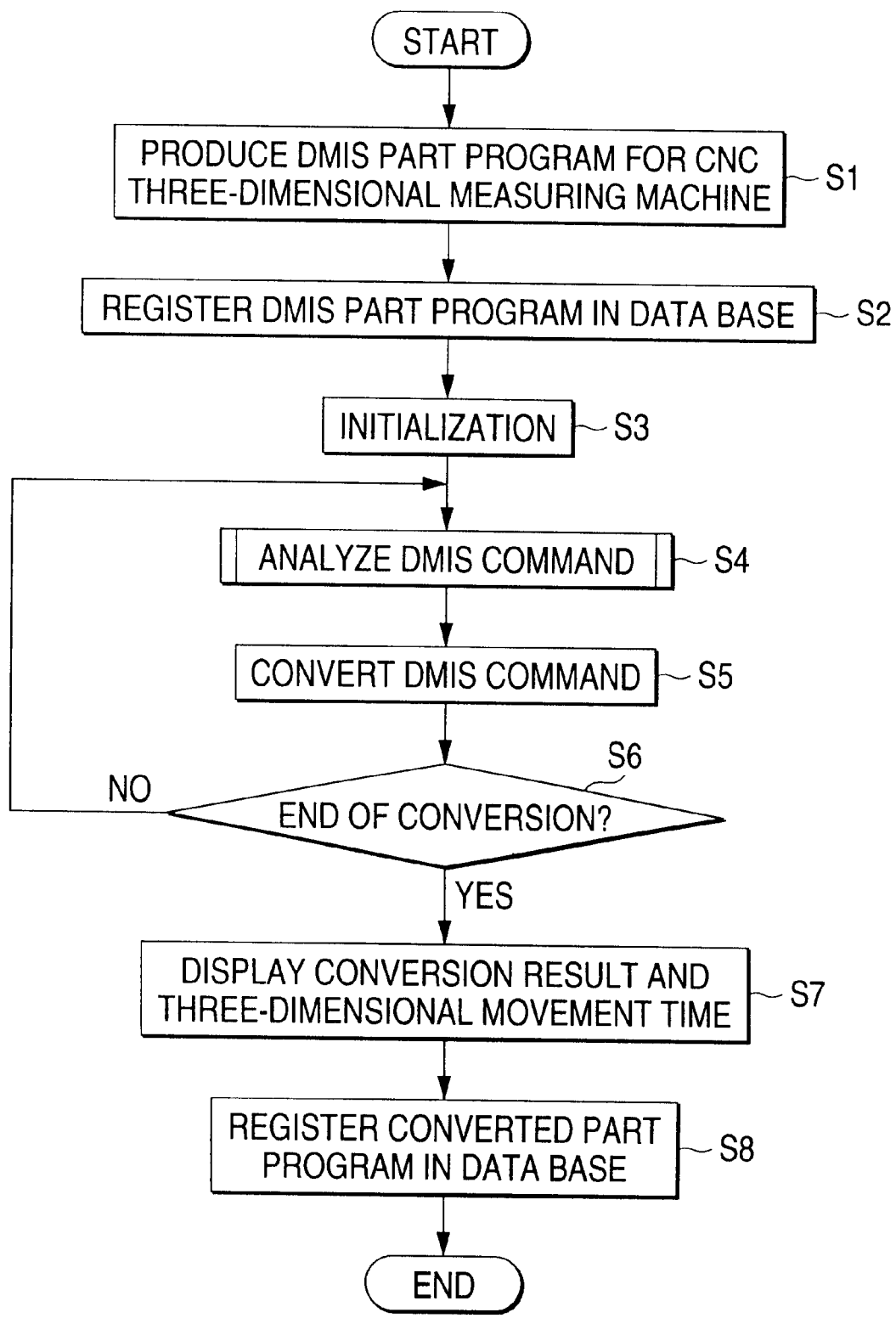
FIG. 7 is a flowchart showing the operation of the system.

Next, the operation of the system will be described with reference to a flowchart of FIG. 7.

First, the DMIS part program for the CNC three-dimensional measuring machine is produced by using the part program producing unit 1 (S1). The produced DMIS part program is registered in the data base 2 (S2). Next, an initialization process is performed so that the movement time Mov Time, the measurement time Meas Time, and the touch back time Touch Bak Time are reset to zero (S3). Thereafter, commands in the DMIS part program are extracted and analyzed (S4). While analyzing the commands, the DMIS part program is converted into a part program which is suitable to the measuring machine (S5). The analyzing and converting operations are applied on all the commands (S6), and the conversion results and the total operating time of the three-dimensional measuring machine are displayed via the displaying unit 6 (S7). Finally, the converted part program and the operating time are registered in the data base 2 (S8), thereby completing the process.

FIG. 8 shows an example of the DMIS part program which is produced in step S1, and FIG. 9 shows an example of another part program which is produced in step S5 and suitable to the measuring machine. Both the programs are fundamentally identical to each other. When commands of a converted part program are analyzed, therefore, it is required only to provide the command analyzing process (S4) with a necessary number of libraries. According to this configuration, the system can cope with various kinds of programs.

Figure 10:
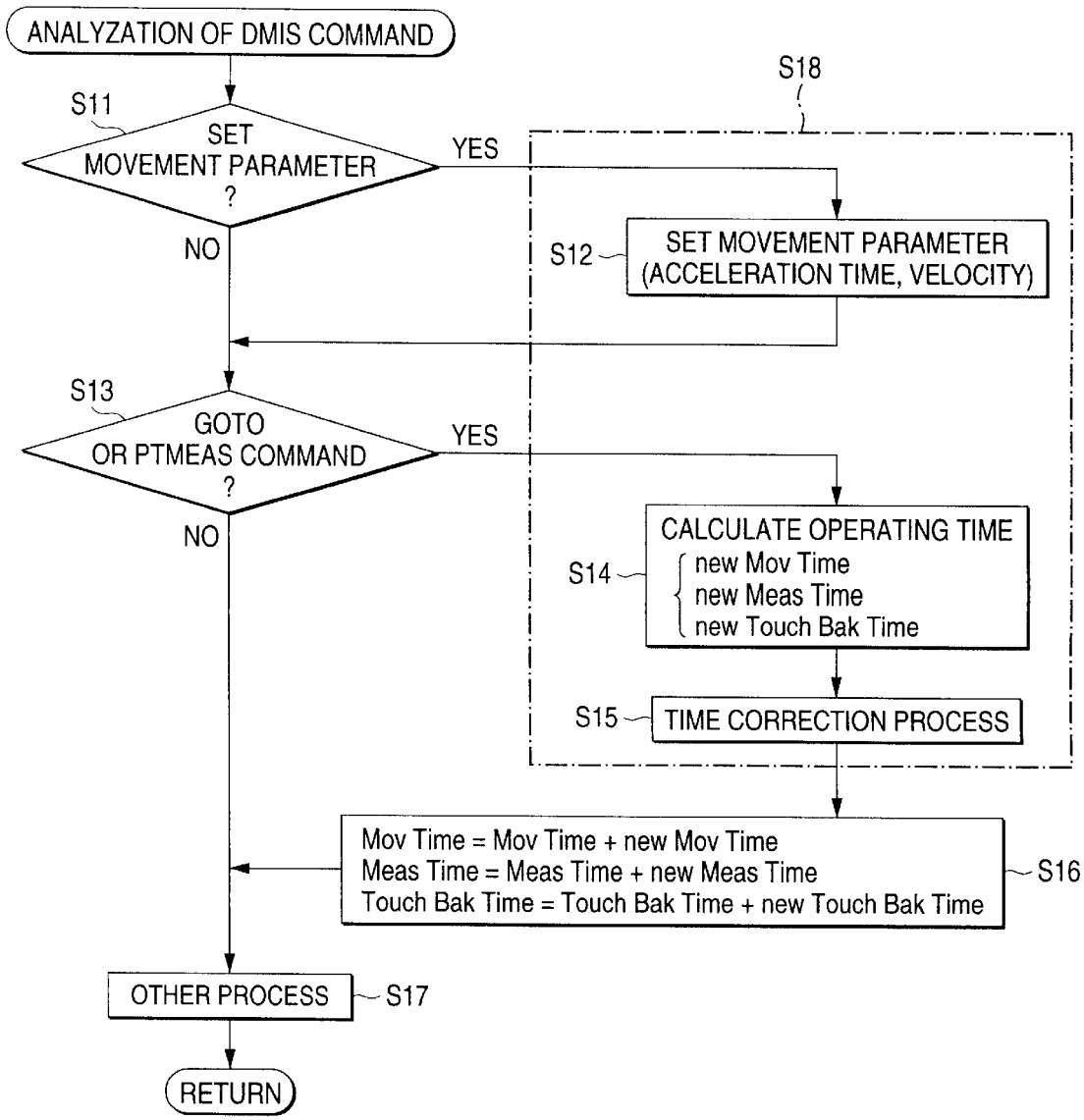
FIG. 10 is a detailed flowchart showing a command analyzing process of FIG. 7.

FIG. 10 is a flowchart showing the command analyzing process (S4) in more detail.

As described above, the movement parameters such as the movement velocity Vmv, the movement acceleration time Tmv, the measurement velocity Vms, and the measurement acceleration time Tms can be set in the movement parameter setting unit 3. On occasions, such parameters may be described in a part program so as to be set or changed. If an extracted command is a setting command for a movement parameter (S1), a movement parameter setting process is implemented (S12). If an extracted command is the movement command (GOTO) or the measurement command (PTMEAS) (S13), the operating time which is to be consumed by implementation of the command is calculated as new Mov Time, new Meas time, or new Touch Bak Time (S14). Next, a time correction process is performed (S15), and the calculated values are summed to the operating times Mov time, Meas Time, and Touch Bak Time, respectively (S16). When a macro process, a process of calculating the direction of the probe, or the like is required to be implemented, the process is implemented (S17), and the command analyzing process is then ended.

Figure 11:
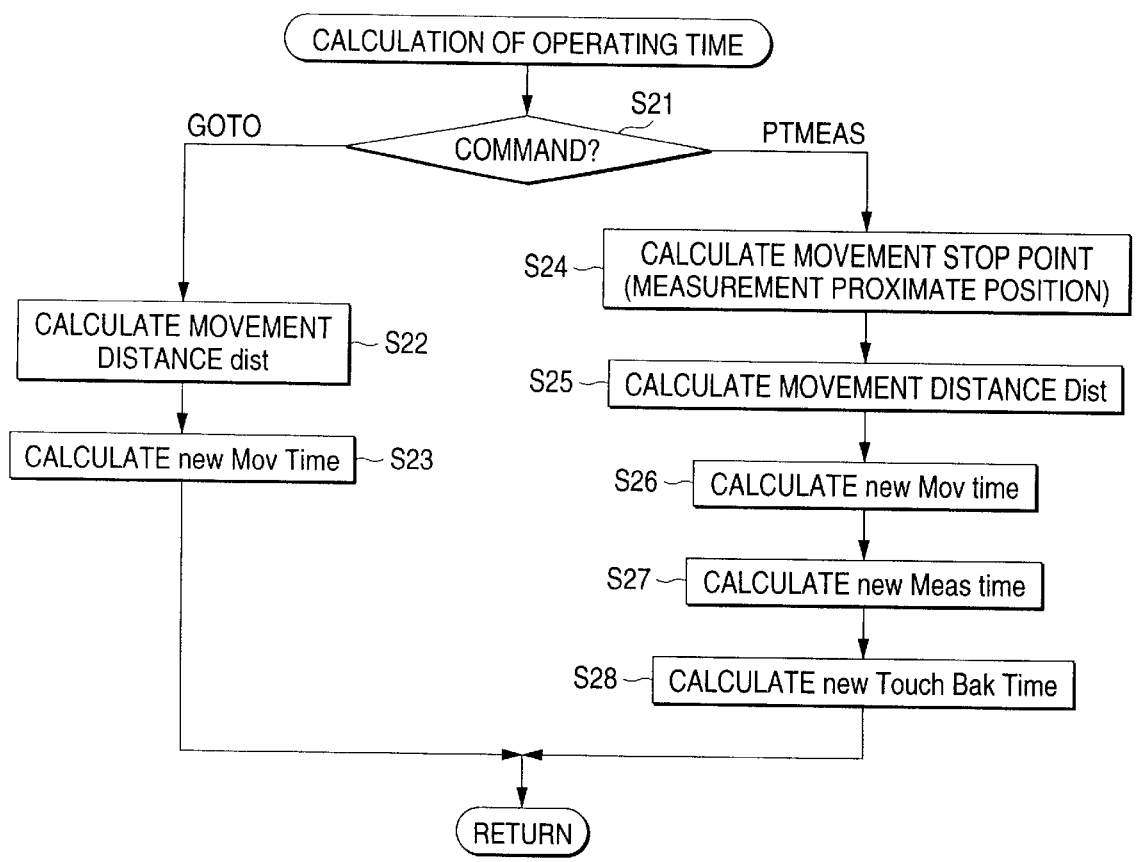
FIG. 11 is a detailed flowchart showing an operating time calculating process of FIG. 10.

FIG. 11 is a flowchart showing the operating time calculating process (S14) in more detail.

If the command is the GOTO command (S21), the movement distance dist of the probe 11 from the current position to the target position is calculated (S22), and the movement time new Mov Time due to implementation of the command is calculated (S23). If the command is the PTMEAS command, a movement stop point (the measurement proximate position: P2 of FIG. 5) is calculated from the measurement position (P1 of FIG. 5) on the basis of the measurement direction (I, J, K) (S24), and the movement distance dist from the current position P0 to the movement stop point P2 is calculated (S25). The movement time new Mov Time, the measurement time new Meas time, and the touch back time new Touch Bak Time which are due to implementation of the command are calculated (S26 to S28).

Figure 12:
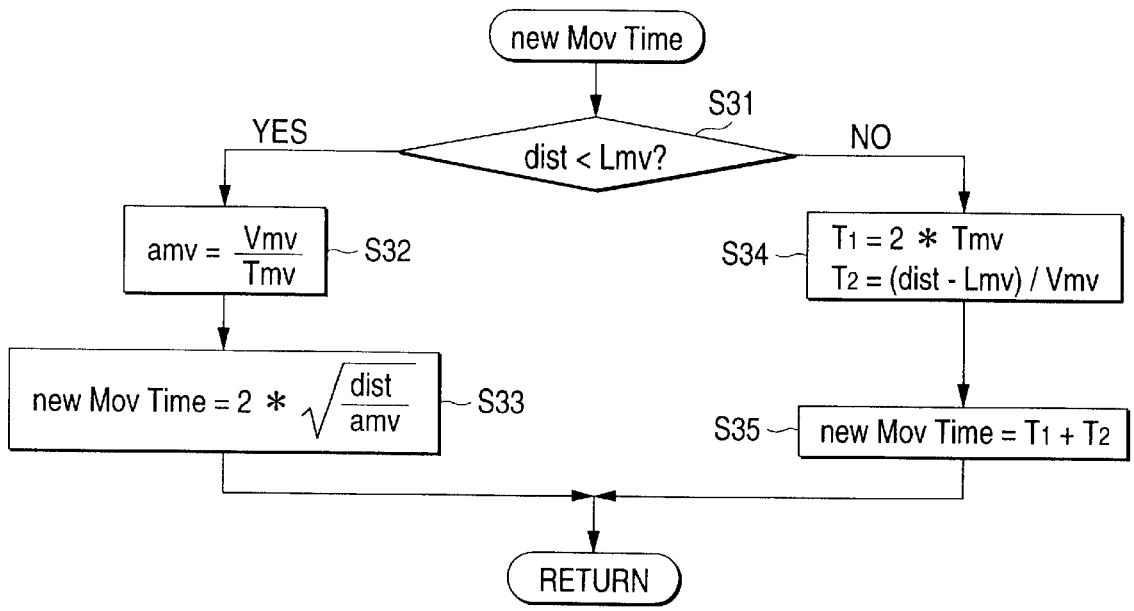
FIG. 12 is a detailed flowchart showing a movement time calculation process of FIG. 11.

The process of calculating the movement time new Mov Time (S23 and S26) is shown in FIG. 12. The movement distance dist is compared with the reference distance Lmv (S31). If dist<Lmv, the acceleration amv is obtained (S32), and the movement time new Mov Time is calculated by $Tmv = 2 * \sqrt{(dist/amv)}$ in accordance with Expression 2 above (S33). If dist≧Lmv, T1 and T2 are obtained by $T1 = 2*Tmv$ and $T2 = (dist - Lmv)/Vmv$, respectively (S34), and the movement time new Mov Time is calculated by T1+T2 in accordance with Expression 3 above (S35). Also the measurement time new Meas time and the touch back time new Touch Bak Time can be calculated fundamentally in the same manner as the method described above. In the case where the movement distance is fixed, these times may be set to have a constant value.

Figure 13:
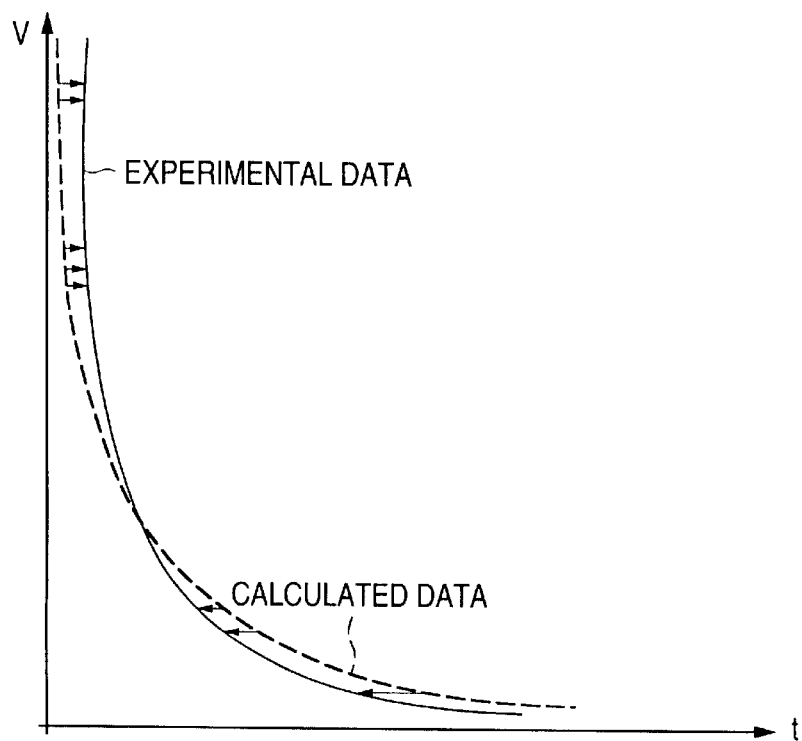
FIG. 13 is a graph showing errors between calculated data and experimental data.
Figures 14, 15:
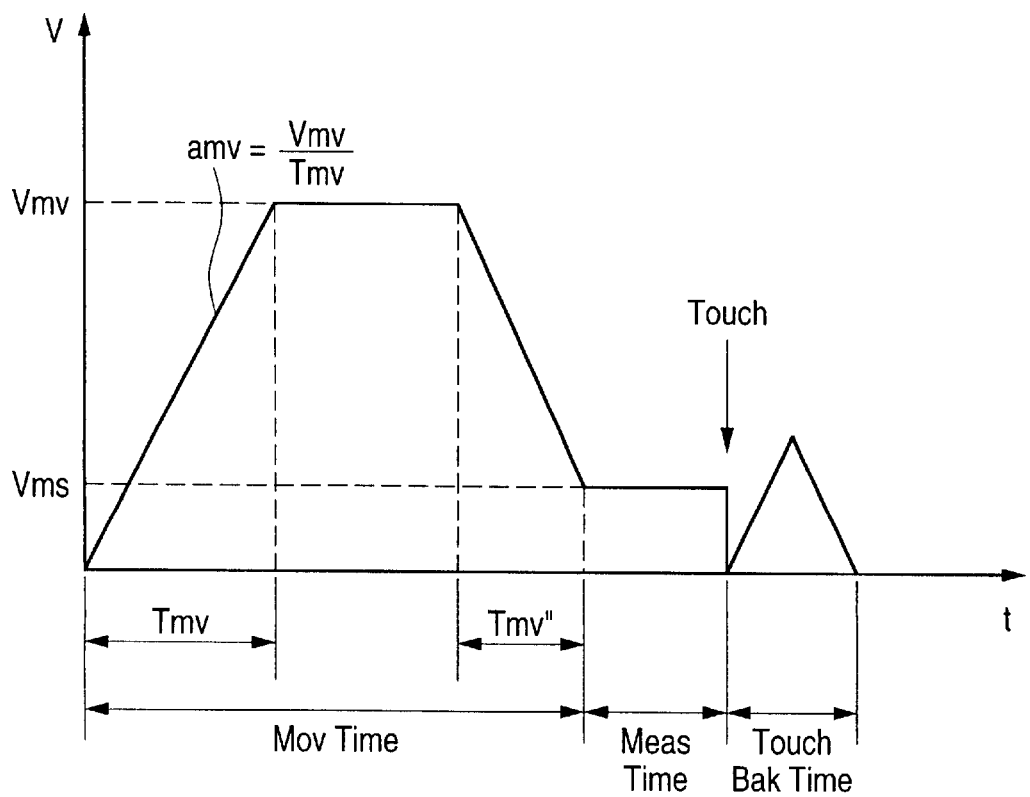
FIG. 14 is a view showing a correction table due to the errors.
FIG. 15 is a view showing a velocity curve of a measurement command according to another embodiment of the invention.

When all the movement time, the measurement time, and the touch back time which are obtained as described above are summed up, the total operating time from the start of measurement to the end of measurement can be obtained. However, the calculated time is nothing but a predicted time. When the operating time is to be predicted more accurately, the calculated value must be corrected so as to coincide with the actual value, in consideration of the delay in operation of each driving unit in an actual measuring machine, a velocity control curve (for example, an S-shaped curve), etc. According to experiments conducted by the Inventors, it is confirmed that calculated data and experimental data have mutual relationships shown in FIG. 13. This example shows relationships that experimental data leads calculated data in a range of a low movement velocity and experimental data lags calculated data as the movement velocity is increased. In consideration of such relationships, a correction table such as shown in FIG. 14 is prepared. In the correction table, correction parameters are stored for respective combinations of the movement velocity Vmv (10, 50, 100, . . . , 500 mm/sec.) and the movement acceleration time Tmv (0.4, 0.48, 0.6, 0.8, and 1.2 sec.). In the time correction process (S15) of FIG. 10, a necessary correction parameter is selected in accordance with the movement velocity and the movement acceleration time, and the time correction process is then performed. When the movement velocity or the movement acceleration time is different from the values registered in the table, a correction parameter may be calculated by an adequate interpolation calculation.

In the above, the example in which only the GOTO command and the PTMEAS command in a DMIS part program are picked up has been described. A part program may have another command, for example, a command for controlling the movement path of the measurement probe so as to elongate along an arc or the like, or that for controlling the probe so that, as shown in FIG. 15, the probe does not make a temporary stop at the measurement proximate position during measurement, and, at the instant of the lowering to the velocity Vms, starts constant velocity motion so as to make contact with the workpiece. In the latter case, as shown in FIG. 15, unlike the case where the probe is temporarily stopped, the probe is not required to be decelerated so that the velocity is once zero, and then accelerated to a predetermined measurement velocity. Therefore, there is no time loss.

The above-mentioned functions of the system are realized by, for example, an operating time calculation program for a computer. Such a program is provided with being stored in an appropriate record medium such as a floppy disk, or a CD-ROM.

As described above, according to the invention, only commands required for estimation of an operating time and relating to movement of a measurement probe are extracted from a part program stored in the storing unit, and the extracted commands are analyzed, thereby calculating operating times due to the respective commands. The calculated operating times are summed up, so as to calculate a total operating time of a measuring machine from a start of measurement to an end of measurement. Therefore, it is not required to actually operate the measuring machine in order to check the measurement time. Consequently, the invention can attain an effect that the time required for checking can be shortened. In the design stage of the part program, moreover, movement velocity information, movement path information, and the like can be suitably changed, so that the part program matches an adequate total operating time, thereby attaining a further effect that reduction of the man-hours for measurement, setting of the production cost, and the like can be easily performed.

The entire disclosure of each and every foreign patent application from which the benefit of foreign priority has been claimed in the present application is incorporated herein by reference, as if fully set forth.

While only certain embodiments of the invention have been specifically described herein, it will apparent that numerous modification may be made thereto without departing from the spirit and scope of the invention.

What is claimed is:

1. An apparatus for calculating an operating time of a measuring machine, comprising:
   part program storing means for storing a part program;
   command analyzing means for extracting commands relating to movement of a measurement probe from the part program stored in said part program storing means, calculating operating times required for the measuring machine to implement the respective extracted commands, on the basis of movement parameters for the movement of said measurement probe, and summing up the calculated operating times to calculate a total operating time from a start of measurement to an end of measurement; and
   displaying means for displaying the total operating time thus calculated by said command analyzing means.

2. The apparatus according to claim 1, wherein the movement parameters include a movement velocity and a movement acceleration time in association with the movement of said measurement probe to each of a designated position and a measurement proximate position, and a measurement velocity and a measurement acceleration time in association with the measurement of said measurement probe,
   the commands relating to movement of said measurement probe include a movement command having movement target position information, and a measurement command having measurement position information and measurement direction information, and
   said command analyzing means,
   when the movement command is extracted, calculates a movement distance from the target position information, and calculates an operating time on the basis of the calculated movement distance, and the movement velocity and the movement acceleration time, and,
   when the measurement command is extracted, calculates a movement path of said measurement probe from the measurement position information and the measurement direction information, and calculates an operating time on the basis of the movement path, the movement velocity, the movement acceleration time, the measurement velocity, and the measurement acceleration time.

3. The apparatus according to claim 2, wherein said apparatus further comprises movement parameter setting means for setting the movement parameters.

4. The apparatus according to claim 2, wherein the movement parameters are described in the part program.

5. The apparatus according to claim 2, wherein said command analyzing means includes correction means for correcting the calculated operating time using a correction coefficient based on the movement velocity.

6. The apparatus according to claim 1, wherein said apparatus further comprises command converting means for converting the part program into a part program suitable for a measurement machine.

7. A medium recording therein a program for calculating an operating time of a measuring machine, the program comprising the steps of:
   reading out a part program stored in storing means;
   extracting commands relating to movement of a measurement probe from the part program;
   calculating operating times required for the measuring machine to implement the respective extracted commands, on the basis of movement parameters for movement of the measurement probe,
   summing up the calculated operating times so as to calculate a total operating time from a start of measurement to an end of measurement, and
   displaying the calculated total operating time on a displaying unit.

8. The medium according to claim 7, wherein the movement parameters include a movement velocity and a movement acceleration time in association with the movement of said measurement probe to each of a designated position and a measurement proximate position, and a measurement velocity and a measurement acceleration time in association with the measurement of said measurement probe,
   the commands relating to movement of said measurement probe include a movement command having movement target position information, and a measurement command having measurement position information and measurement direction information, and
   said calculating step,
   when the movement command is extracted, calculates a movement distance from the target position information, and calculates an operating time on the basis of the calculated movement distance, and the movement velocity and the movement acceleration time, and,
   when the measurement command is extracted, calculates a movement path of said measurement probe from the measurement position information and the measurement direction information, and calculates an operating time on the basis of the movement path, the movement velocity, the movement acceleration time, the measurement velocity, and the measurement acceleration time.

9. The medium according to claim 8, wherein the program further comprises the step of reading out the movement parameters from movement parameter setting means for setting the movement parameter.

10. The medium according to claim 8, wherein the movement parameter is described in the part program.

11. The medium according to claim 7, wherein the program further comprises the step of correcting the calculated operating time using a correction coefficient based on the movement velocity.

12. An apparatus for calculating an operating time of a measuring machine, comprising:

a part program storing unit storing a part program;

a command analyzing unit extracting commands relating to movement of a measurement probe from the part program stored in said part program storing unit, calculating operating times required for the measuring machine to implement the respective extracted commands, on the basis of movement parameters for the movement of said measurement probe, and summing up the calculated operating times to calculate a total operating time from a start of measurement to an end of measurement; and a displaying unit displaying the total operating time thus calculated by said command analyzing unit.

13. The apparatus according to claim 12, wherein the movement parameters include a movement velocity and a movement acceleration time in association with the movement of said measurement probe to each of a designated position and a measurement proximate position, and a measurement velocity and a measurement acceleration time in association with the measurement of said measurement probe, the commands relating to movement of said measurement probe include a movement command having movement target position information, and a measurement command having measurement position information and measurement direction information, and said command analyzing unit, when the movement command is extracted, calculates a movement distance from the target position information, and calculates an operating time on the basis of the calculated movement distance, and the movement velocity and the movement acceleration time, and, when the measurement command is extracted, calculates a movement path of said measurement probe from the measurement position information and the measurement direction information, and calculates an operating time on the basis of the movement path, the movement velocity, the movement acceleration time, the measurement velocity, and the measurement acceleration time.

14. The apparatus according to claim 13, wherein said apparatus further comprises a movement parameter setting unit setting the movement parameters.

15. The apparatus according to claim 13, wherein the movement parameters are described in the part program.

16. The apparatus according to claim 13, wherein said command analyzing unit includes a correction unit correcting the calculated operating time using a correction coefficient based on the movement velocity.

17. The apparatus according to claim 12, wherein said apparatus further comprises a command converting unit converting the part program into a part program suitable for a measurement machine.

* * * * *